(12) United States Patent
Kikuchi et al.

(10) Patent No.: US 8,722,219 B2
(45) Date of Patent: May 13, 2014

(54) FUEL CELL STACK HAVING GAS DISCHARGE PASSAGE AND DRAINAGE PASSAGE JOINED AT ONE END OF THE STACK

(75) Inventors: Hideaki Kikuchi, Kawachi-gun (JP); Masaru Oda, Utsunomiya (JP); Masaharu Suzuki, Utsunomiya (JP); Norimasa Kawagoe, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1483 days.

(21) Appl. No.: 11/599,925

(22) Filed: Nov. 14, 2006

(65) Prior Publication Data
US 2007/0111083 A1 May 17, 2007

(30) Foreign Application Priority Data
Nov. 16, 2005 (JP) ................... 2005-331095

(51) Int. Cl.
*H01M 8/24* (2006.01)
*H01M 8/10* (2006.01)

(52) U.S. Cl.
USPC ............. 429/38; 429/414; 429/457; 429/483; 429/514

(58) Field of Classification Search
None
See application file for complete search history.

(56) References Cited

U.S. PATENT DOCUMENTS

| | | | | |
|---|---|---|---|---|
| 7,276,311 B2 * | 10/2007 | Yasuo et al. | | 429/414 |
| 2004/0180255 A1 * | 9/2004 | Maus et al. | | 429/35 |
| 2004/0229100 A1 * | 11/2004 | Komura et al. | | 429/32 |
| 2006/0024557 A1 * | 2/2006 | Iritsuki et al. | | 429/37 |
| 2006/0110650 A1 * | 5/2006 | Sugiura et al. | | 429/38 |

FOREIGN PATENT DOCUMENTS

| | | |
|---|---|---|
| JP | 2000-164237 | 6/2000 |
| JP | 2001-118596 | 4/2001 |
| JP | 2001-266925 | 9/2001 |
| JP | 2003-077495 | 3/2003 |
| JP | 2004-134130 | 4/2004 |
| JP | 2005-251526 | 9/2005 |

OTHER PUBLICATIONS

Japanese Office Action for Application No. 2005-331095, dated Oct. 26, 2010.

* cited by examiner

*Primary Examiner* — Alix Echelmeyer
(74) *Attorney, Agent, or Firm* — Nelson Mullins Riley & Scarbourgh LLP; Anthony A. Laurentano

(57) ABSTRACT

A fuel cell stack includes stacked unit fuel cells provided between end holding members, each unit fuel cell having a membrane electrode assembly including an anode and a cathode. A pair of separators respectively contact the anode and the cathode, and respectively form reaction gas passages between one separator and the anode, and between the other separator and the cathode. For each reaction gas passage, a gas supply passage and a gas discharge passage are formed through the unit fuel cells and one end holding member so that they communicate with the reaction gas passage of each unit fuel cell, and a drainage passage is also formed through the unit fuel cells and one end holding member. An end of the drainage passage and an end of the gas discharge passage on the side of the other end holding member are joined to each other.

6 Claims, 9 Drawing Sheets

FUEL CELL STACK HAVING GAS DISCHARGE PASSAGE AND DRAINAGE PASSAGE JOINED AT ONE END OF THE STACK

BACKGROUND OF THE INVENTION

1. Field of the Invention

The present invention relates to a fuel cell stack formed by stacking a plurality of unit fuel cells, in particular, a fuel cell stack having a drainage structure for draining produced water, or condensed water accompanied with the electric power generation.

Priority is claimed on Japanese Patent Application No. 2005-331095, filed Nov. 16, 2005, the content of which is incorporated herein by reference.

2. Description of the Related Art

In a known fuel cell, an anode and a cathode are provided on either side of a solid polymer electrolyte membrane so as to form a membrane electrode assembly. The membrane electrode assembly is placed between a pair of separators for forming reaction gas passages, thereby forming a unit fuel cell (called a "unit cell" below). Generally, a specific number of unit cells are stacked, and the stacked body is supported between end holding members, thereby forming a fuel cell stack.

In each unit cell, hydrogen gas and oxygen gas (actually, air which includes oxygen) are respectively supplied as reaction gases to the anode and the cathode, so that an electrochemical reaction between oxygen and hydrogen ions which pass through the electrolyte membrane, generates electric power. In the electrochemical reaction, in addition to the electric power generation, reaction water is generated at the cathode, and this reaction water is drained and discharged via the cathode to the outside of the fuel cell stack, together with an exhausted gas (called an "off gas" below). Part of the reaction water generated at the cathode is back diffused toward the anode through the electrolyte membrane, and this back-diffused reaction water is drained and discharged via the anode to the outside of the fuel cell stack, together with the anode off gas.

To each unit cell, reaction gases including water vapor are supplied so as to humidify the electrolyte membrane. The water vapor in the reaction gases is likely to condense in the unit cell or gas discharge passages, and transformed into condensed water, which is also drained to the outside of the fuel cell stack, together with the anode off gas.

In this type of fuel cell stack, gas supply passages and gas discharge passages, which communicate with reaction gas passages of each unit cell, are formed in a manner such that they penetrate through every unit cell and one of the end holding members. An end of each gas discharge passage, which is formed at the one of the end holding members, is arranged at a lower position of the fuel cell stack so that the above-described reaction water or condensed water (called "residual water" below) can be reliably drained to the outside.

However, an external piping member having a relatively large diameter is connected to the end of the gas discharge passage at said one of the end holding members; thus, it may be difficult to arrange the end of the gas discharge passage at a sufficiently low position of the fuel cell stack.

As a technique for solving the above problem, Japanese Unexamined Patent Application, First Publication No. 2000-164237 discloses a fuel cell stack having an end holding member which has (i) a gas passage bending upward from a gas discharge passage of the unit cells, and (ii) a branch passage for drainage, which communicates with an inner and lower end part of the gas discharge passage of the unit cells.

However, in this conventional fuel cell stack, the branch passage for drainage is provided only at a lower end position of one of the end holding members. Therefore, when the fuel cell stack is inclined in a manner such that the other end holding member is positioned lower, it is difficult to drain the residual water from the inside of the fuel cell stack.

In order to solve this problem, an improved structure has been examined in which similar branch passages for drainage are provided at both end holding members (positioned at front and back sides), so that the residual water can be drained through either branch passage.

However, generally, it is preferable to perform drainage of the fuel cell stack through a single piping member, in consideration of marketability. Therefore, when the branch passages for drainage are provided at both end holding members, as described above, additional piping should be provided outside the fuel cell stack, so as to collect waterdrops drained from both branch passages. Accordingly, the above presently-examined fuel cell stack needs long external piping, which may considerably increase the manufacturing cost. In addition, the space occupied by the piping should be increased.

SUMMARY OF THE INVENTION

In light of the above circumstances, an object of the present invention is to provide a fuel cell stack for reducing the size of external piping for drainage, thereby reducing the manufacturing cost and the occupied space.

Therefore, the present invention provides a fuel cell stack (e.g., a fuel cell stack S in an embodiment explained later) comprising a plurality of stacked unit fuel cells (e.g., fuel cells 10 in the embodiment) and end holding members (e.g., end plates 90A and 90B in the embodiment) for interposing and holding the stacked unit fuel cells from both sides thereof along a direction in which the unit fuel cells are stacked, wherein:

each unit fuel cell has:
  a membrane electrode assembly (e.g., a membrane electrode assembly 20 in the embodiment) in which an anode and a cathode interpose an electrolyte membrane; and
  a pair of separators (e.g., separators 30A and 30B in the embodiment) which respectively closely contact the anode and the cathode of the membrane electrode assembly, so as to respectively form reaction gas passages (e.g., reaction gas passages 51 in the embodiment) between one of the separators and the anode, and between the other separator and the cathode, and with respect to each of the reaction gas passage facing toward the anode and the reaction gas passage facing toward the cathode:
  a gas supply passage and a gas discharge passage are formed penetrating through the stacked unit fuel cells and one (e.g., an end plate 90A in the embodiment) of the end holding members in a manner such that they communicate with the reaction gas passage of each unit fuel cell; and
  a drainage passage is also formed penetrating through the stacked unit fuel cells and said one of the end holding members, wherein an end of the drainage passage and an end of the gas discharge passage on the side of the other end holding member (e.g., an end plate 90B in the embodiment) are joined to each other.

In accordance with the above structure, residual water drawn from each reaction gas passage of each unit fuel cell to the corresponding gas discharge passage is drained to the outside of the fuel cell stack (i) though the end of the gas discharge passage which directly communicates with one of the end holding members, or (ii) the drainage passage joined to the gas discharge passage at the other end holding member.

In addition, when the residual water is drawn into the drainage passage, gas pressure is applied to the residual water from the gas discharge passage so as to push the residual water toward the outside of the fuel cell stack. Therefore, even when the fuel cell stack is inclined in a manner such that the other end holding member is positioned lower, the water can be reliably drained through the drainage passage to the outside of the fuel cell stack.

In addition, the drainage passage is formed through the unit fuel cells through which heat generated in accordance with the electric power generation is directly transmitted; thus, the heat due to the electric power generation is quickly transmitted to the drainage passage. Therefore, even if the residual water remains in the drainage passage and freezes, the frozen residual water can be quickly melted using the heat generated by the electric power generation.

Also in the above structure, the drainage passage joined to the other end of the gas discharge passage is formed through the stacked unit fuel cells and one of the end holding members; thus, it is unnecessary to provide external piping for drainage to both end holding members. Therefore, it is possible to reduce the manufacturing cost and the size of external piping.

Typically, the drainage passage has a sectional area smaller than that of the gas discharge passage. Accordingly, when the residual water is drawn from the gas discharge passage to the drainage passage, it easily occupies the sectional area of the drainage passage, so that a pressure difference before and after the residual water is increased, thereby easily pushing and more reliably draining the residual water to the outside of the fuel cell stack.

Preferably, a communication part (e.g., a communication part 95 in the embodiment) for joining the gas discharge passage and the drainage passage to each other is provided at the other end holding member.

Accordingly, the residual water drawn into the gas discharge passage flows toward at least one of the end holding members, and the water flowing to said one of the end holding members is directly drained through the gas discharge passage to the outside of the fuel cell stack, while the water flowing to the other end holding member is drawn through the communication part of the other end holding member into the drainage passage, and is drained through the drainage passage to the outside of the fuel cell stack. Therefore, the ends of the gas discharge passage and the drainage passage can be joined to each other without using external piping; thus, the size of the fuel cell stack can be more advantageously reduced.

In this case, it is possible that:
on each side of each unit fuel cell, a sealing member (e.g., sealing members 43 and 44 in the embodiment) is provided between an edge of the gas discharge passage and an edge of the drainage passage, so as to prevent leakage of water through a gap between each edge and a member facing thereof; and
at the other end holding member, the communication part has:
  a recessed groove (e.g., a recessed groove 60 in the embodiment) for joining the gas discharge passage and the drainage passage to each other; and
  a reaction force receiving member (e.g., a cover plate 61 and a support protrusion 63 in the embodiment), arranged in the recessed groove, for receiving a reaction force applied from the sealing member which belongs to the unit fuel cell adjacent to the other end holding member and contacts the reaction force receiving member.

In this case, the residual water drawn from the gas discharge passage toward the other end holding member flows into the drainage passage through the communication part which has the recessed groove and the reaction force receiving member provided at the other end holding member. The unit fuel cell adjacent to the other end holding member has a sealing member arranged between the gas discharge passage and the drainage passage, which contacts the reaction force receiving member at the other end holding member. Therefore, it is possible to more reliably prevent leakage of water by using the sealing member, and to prevent the adjacent unit fuel cell from deforming toward the inside of the recessed groove. Accordingly, in this structure, the gas discharge passage can be reliably joined to the drainage passage, and the reaction force applied from the sealing member of the adjacent unit fuel cell can be reliably received by the reaction force receiving member. Therefore, it is possible to further improve the sealing performance using the sealing member, and to reliably prevent the adjacent unit fuel cell which faces the recessed groove from partially deforming toward the recessed groove.

It is also possible that:
the other end holding member has an end plate (e.g., an end plate 90B in the embodiment) and an insulating member (e.g., an insulating member 98 in the embodiment) which is positioned between the end plate and the unit fuel cell adjacent to the other end holding member; and
the communication part is formed in the insulating member.

Preferably, the lowest position of the drainage passage is lower than the lowest position of the gas discharge passage with respect to the gravitational direction.

DETAILED DESCRIPTION OF THE INVENTION

Hereinafter, an embodiment of a fuel cell stack in accordance with the present invention will be described with reference to the appended figures. A fuel cell stack "S" of this embodiment is used in a fuel cell automobile.

Figure 1:
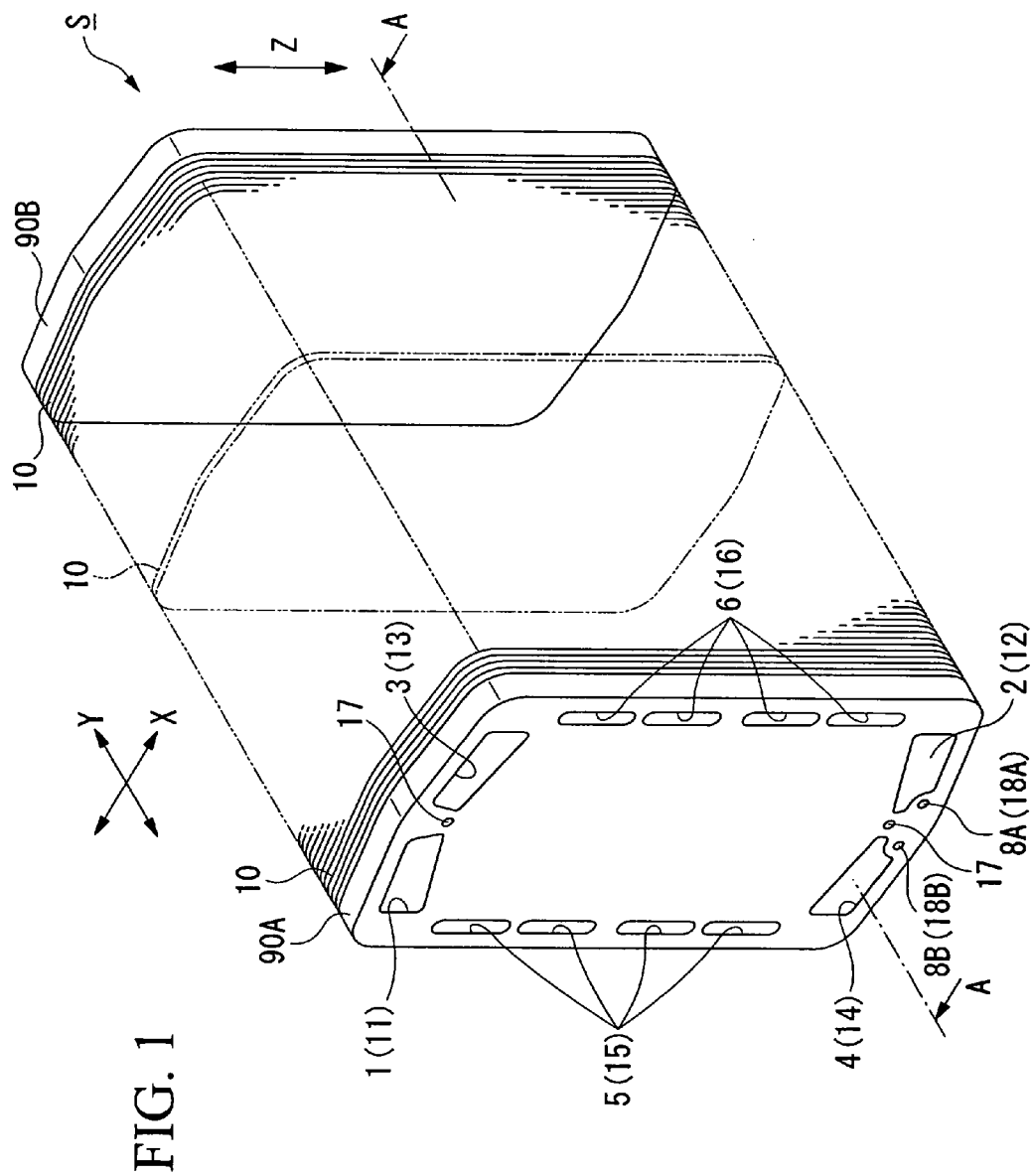
FIG. 1 is a general perspective view of the fuel cell stack as an embodiment in accordance with the present invention.
Figure 4:
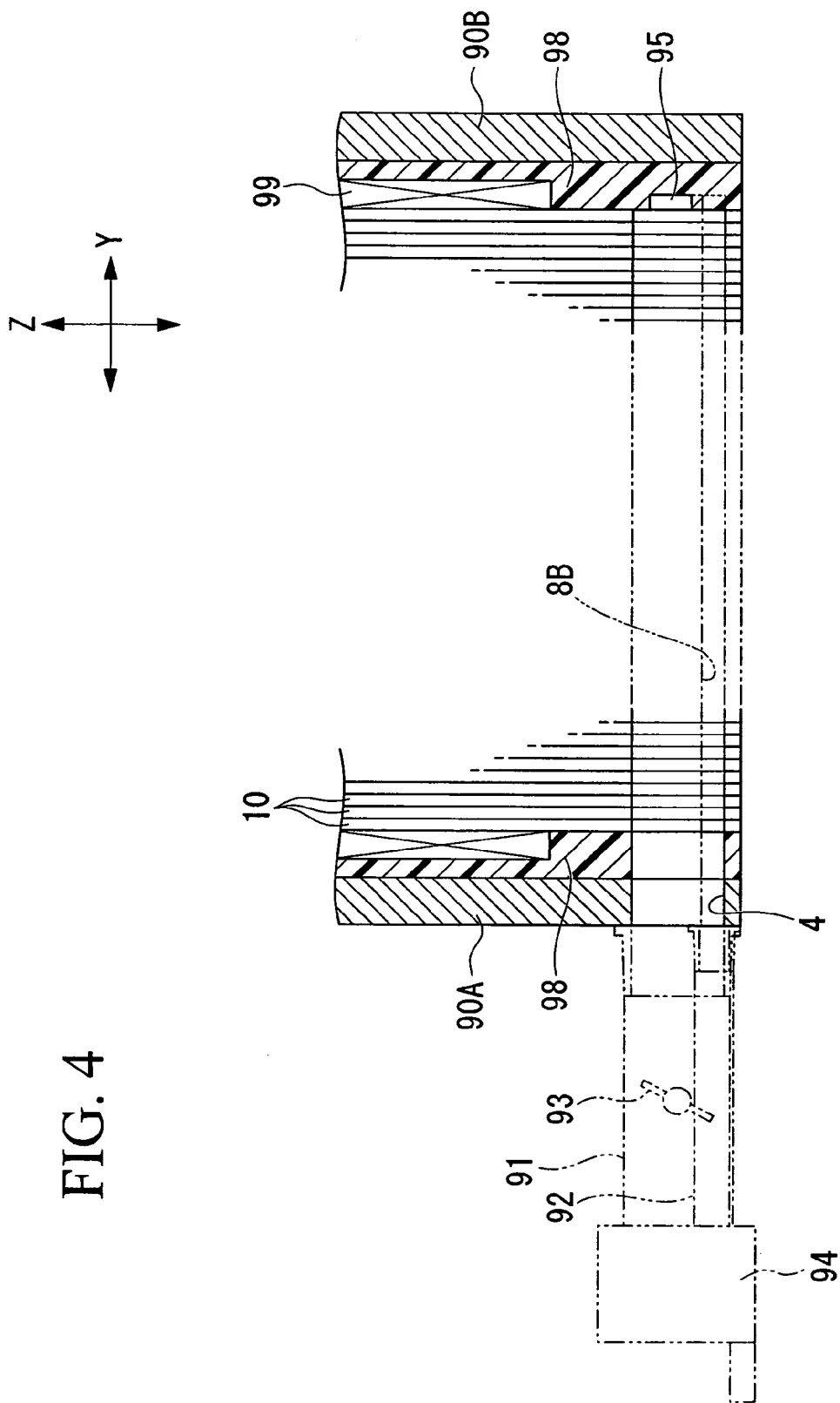
FIG. 4 is a sectional view along line A-A in FIG. 1.

FIG. 1 is a general perspective view of the fuel cell stack S in which a number of unit fuel cells 10 (called "unit cells" below) are stacked and electrically connected in series, end plates 90A and 90B interpose the stacked body, and these elements are fastened together using tie rods (not shown). In each unit cell 10, longitudinal sides are longer than lateral sides. As shown in FIG. 4, a current collector 99 is provided via an insulating member 98 between the end plate 90A and an electrode face of the unit cell 10 which faces the end plate 90A, and similarly, another current collector 99 is provided via another insulating member 98 between the end plate 90B and an electrode face of the unit cell 10 which faces the end plate 90B. In the present embodiment, the end plates 90A and 90B and the insulating members 98 function as the end holding members of the present invention.

The fuel cell stack S of this embodiment is installed in the vehicle while the longitudinal sides thereof are arranged vertically. In the appended figures, arrows X and Y indicate horizontal directions, and arrow Z indicates a vertical direction.

Figure 2:
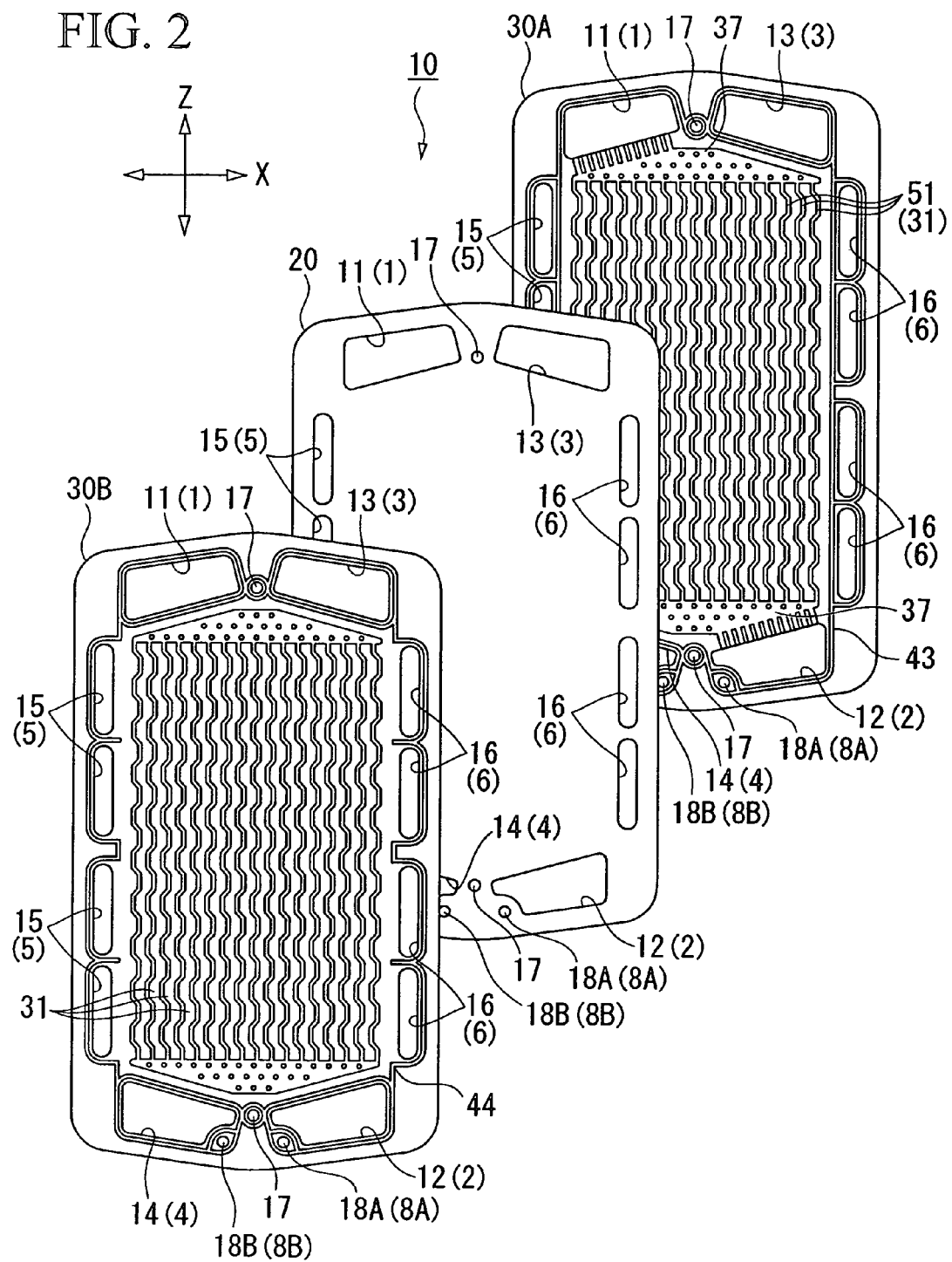
FIG. 2 is an exploded view of the unit fuel cell as a constituent of the fuel cell stack.
Figure 5:
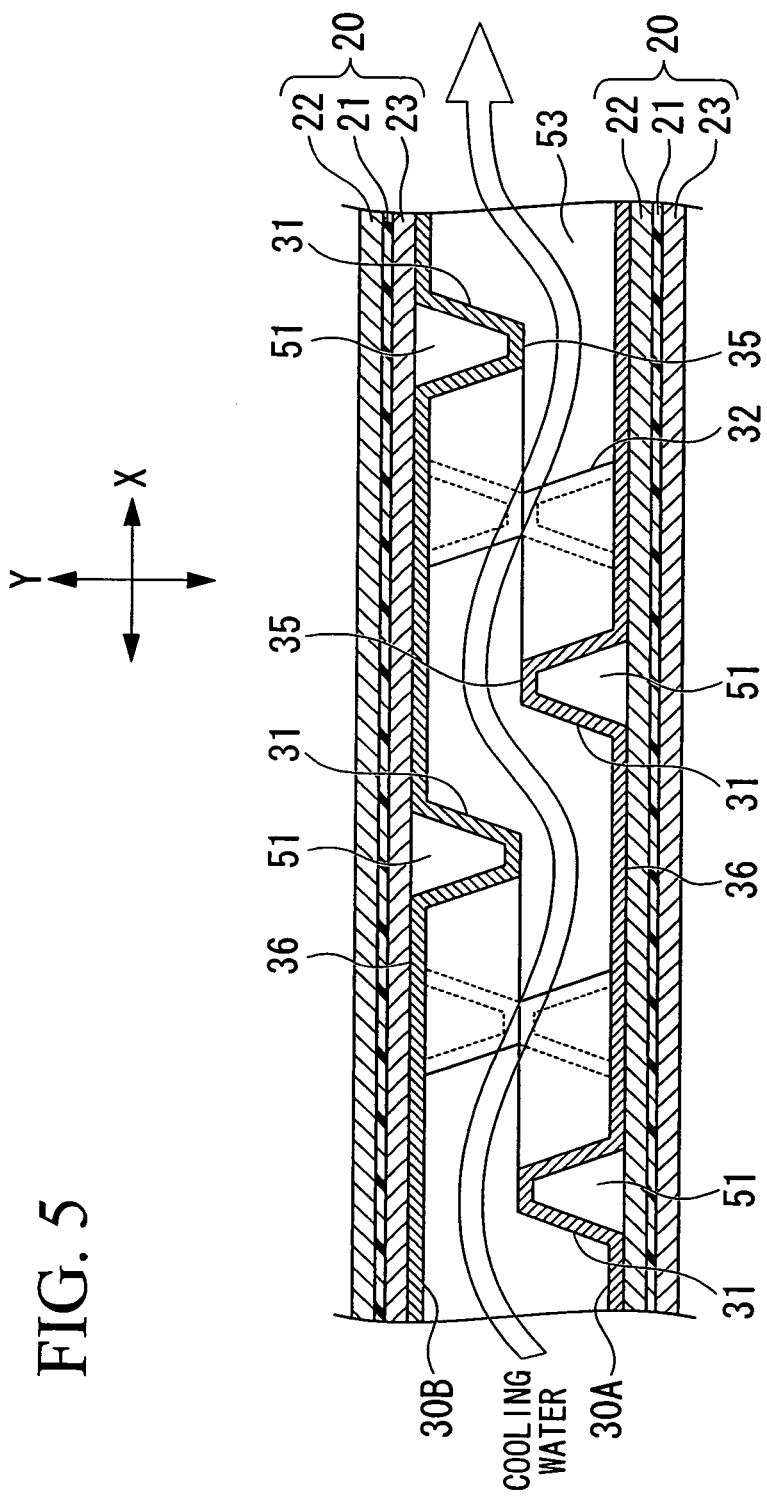
FIG. 5 is a partially sectional view of the fuel cell stack of the embodiment.
Figure 6:
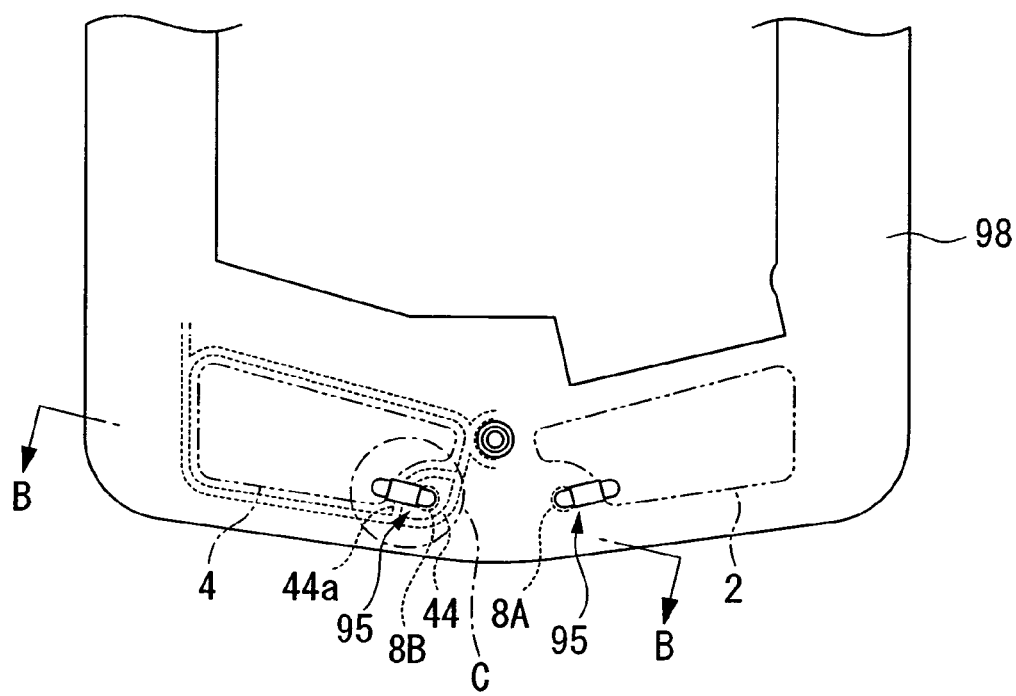
FIG. 6 is a plan view of the insulating member as a constituent of the fuel cell stack.

As shown in FIG. 2, each of the unit cells 10 has a sandwich structure in which a membrane electrode assembly 20 is provided between separators 30A and 30B. More specifically, as shown in FIG. 5, the membrane electrode assembly 20 has a solid polymer electrolyte membrane 21 (made of a fluorine electrolyte material or the like) provided between an anode 22 and a cathode 23, and the separators 30A and 30B respectively face the anode 22 and the cathode 23. The separators 30A and 30B are each formed by press forming using a metal plate so as to produce a specific form. In the fuel cell stack S formed by stacking the unit cells 10 having the above-described structure, the separator 30A facing toward the anode 22 of one of any two adjacent unit cells 10 closely contacts the separator 301B facing toward the cathode 23 of the other unit cell 10.

In FIG. 2, at each upper-left corner of the membrane electrode assembly 20 and the separators 30A and 30B, a fuel gas supply hole 11 is provided, through which an unused (or unreacted) fuel gas (e.g., hydrogen gas) flows. At each lower-right corner (i.e., the diagonal position of the above) of these elements, an anode off-gas discharge hole 12 is provided, through which an exhausted fuel gas (called an "anode off-gas" below) flows.

Similarly, at each upper-right corner of the membrane electrode assembly 20 and the separators 30A and 30B, an oxidant gas supply hole 13 is provided, through which an unused oxidant gas flows. At each lower-left corner (i.e., the diagonal position of the above) of these elements, a cathode off-gas discharge hole 14 is provided, through which an exhausted oxidant gas (called a "cathode off-gas" below) flows.

In addition, at each left end of the membrane electrode assembly 20 and the separators 30A and 30B, four cooling water supply holes 15 are aligned vertically, through which unused cooling water flows, and at each right end (i.e., the symmetrical position of the above) of these elements, four cooling water drainage holes 16 are aligned vertically, through which exhausted cooling water flows. The cooling water supply holes 15 and the cooling water drainage holes 16 are positioned lower than the fuel gas supply hole 11 and the oxidant gas supply hole 13, and higher than the anode off-gas discharge hole 12 and the cathode off-gas discharge hole 14.

Between the fuel gas supply hole 11 and the oxidant gas supply hole 13, and also between the anode off-gas discharge hole 12 and the cathode off-gas discharge hole 14, tie rod through-holes 17 are provided, through which tie rods for fastening the fuel cell stack S pass.

The anode off-gas discharge hole 12 and the cathode off-gas discharge hole 14 each have a substantially rectangular shape, and also a downward shape toward the center between both holes. However, the membrane electrode assembly 20 and the separators 30A and 30B each have expanding parts which respectively protrude toward the inside of the anode off-gas discharge hole 12 and the cathode off-gas discharge hole 14, in a manner such that the expanding parts are positioned outside of the lower corners (which face each other) of the anode off-gas discharge hole 12 and the cathode off-gas discharge hole 14. In the expanding parts, circular drainage holes 18A and 18B are provided, which have areas sufficiently smaller than those of the anode off-gas discharge hole 12 and the cathode off-gas discharge hole 14. The heights of the lower ends of the drainage holes 18A and 18B are at least lower than the heights of the lower ends of the anode off-gas discharge hole 12 and the cathode off-gas discharge hole 14.

As shown in FIG. 1, in one of the end plates (here, the end plate 90A) and the insulating member 98 (not shown) inside thereof, similar holes are provided at positions corresponding to the above-described gas supply holes 11 and 13, the off-gas discharge holes 12 and 14, the supply holes 15 and the drainage holes 16 of cooling water, and the drainage holes 18A and 18B. The holes of the end plate 90A are given identical reference numerals with respect to the corresponding holes of each unit cell 10, and are given the same terms.

In the assembled fuel cell stack S, the gas supply holes 11 and 13, the off-gas discharge holes 12 and 14, the supply holes 15 and the drainage holes 16 of cooling water, and the drainage holes 18A and 18B of the end plate 90A (i.e., one of the end plates) and the unit cells 10 respectively form through passages along the stacking direction of the unit cells 10. More specifically, (i) the fuel gas supply holes 111 and the oxidant gas supply holes 13 respectively form gas supply passages 1 and 3, (ii) the off-gas discharge holes 12 and the cathode off-gas discharge holes 14 respectively form gas discharge passages 2 and 4, (iii) the supply holes 15 and the drainage holes 16 of cooling water respectively form supply passages 5 and return passages 6 of the cooling water, and (iv) the drainage holes 18A and the drainage holes 18B respectively form drainage passages 8A and 8B of residual water.

The ends of the gas supply passages 1 and 3 at the end plate 90A, that is, the gas supply holes 11 and 13 of the end plate 90A, are respectively connected to a hydrogen tank (i.e., a fuel gas supply source) and an air compressor (i.e., an oxidant gas supply source) via piping (not shown). The ends of the gas discharge passages 2 and 4 at the end plate 90A are respectively connected to exhaust pipes 91 (in FIG. 4, only the exhaust pipe 91 on the cathode side is shown). The ends of the drainage passages 8A and 8B at the end plate 90A are respectively connected to thin drainage pipes 92 (in FIG. 4, only the drainage pipe 92 on the cathode side is shown). In FIG. 4, reference numeral 93 indicates a gas pressure control valve arranged in each exhaust pipe 91, and reference numeral 94 indicates a drainage box at which the exhaust pipes 91 and the drainage pipes 92 are merged together so that drainage of the residual water is performed in a single area.

In addition, the ends of the supply passages 5 and the return passages 6 of the cooling water at the end plate 90A are each connected to a circulating supply circuit of cooling water via a manifold (not shown).

On the other hand, at the other end plate 90B, the gas supply passages 1 and 3, the supply passages 5, and the return passages 6 are each sealed using the insulating member 98, and the gas discharge passages 2 and 4 are respectively joined to ends of the drainage passages 8A and 8B via communication parts 95 formed in the insulating member 98. The communication parts 95 will be explained in detail later.

Below, passages inside each unit cell 10 will be explained.

The separator 30A facing toward the anode and the separator 30B facing toward the cathode have generally similar structures while the arrangement of the front and back sides is inverse between them. Therefore, here, the separator 30A facing toward the anode will be explained in detail (see FIG. 3).

Figure 3:
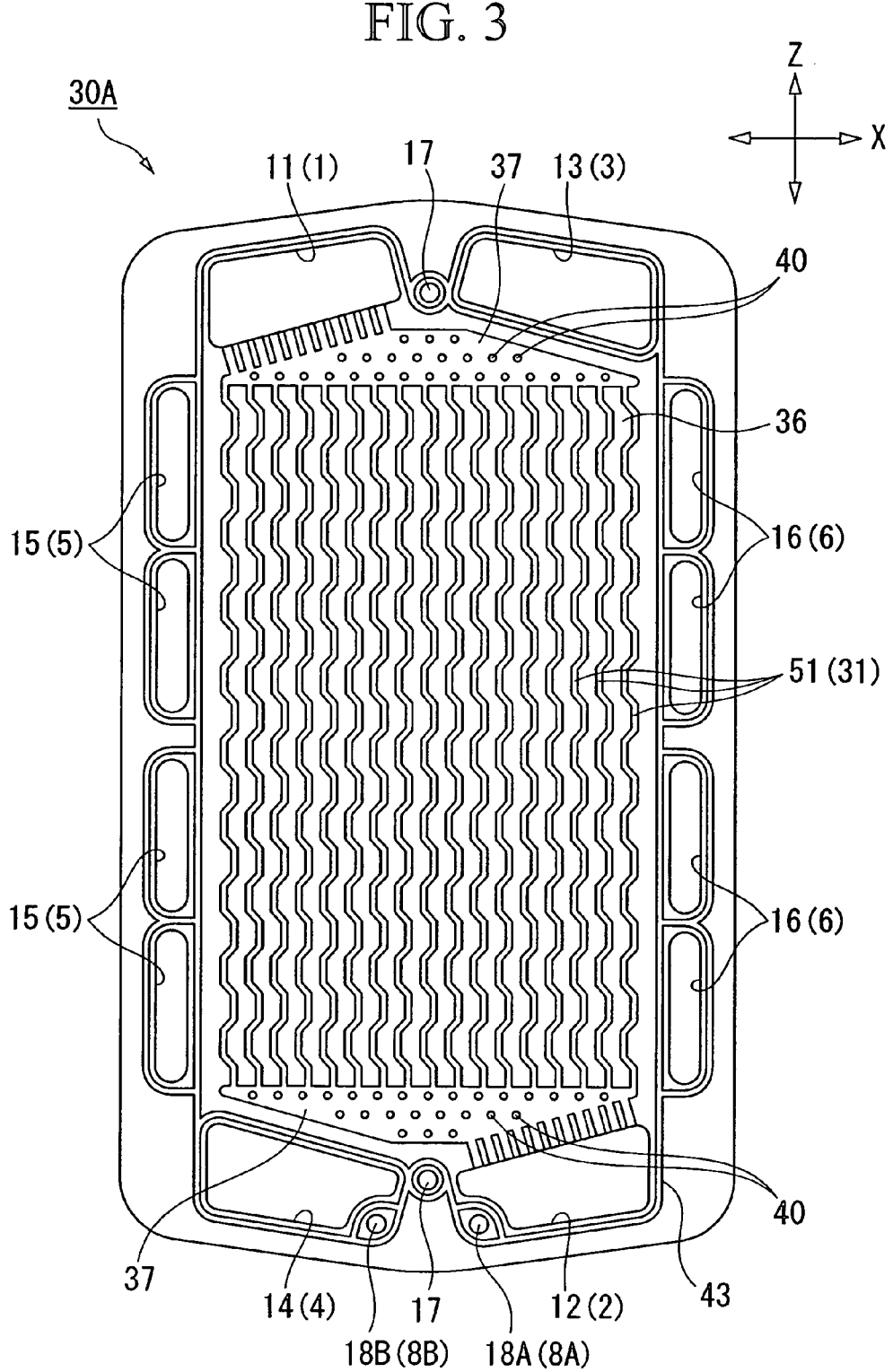
FIG. 3 is a front view of the separator as a constituent of the unit fuel cell.

As shown in FIG. 3, the separator 30A has a flat part 36, a surface of which contacts the membrane electrode assembly 20. In a rectangular area between the cooling water supply holes 15 and the cooling water drainage holes 16, a plurality of protruding lines 31 are formed vertically, which protrude in the direction going away from the membrane electrode assembly 20. Each protruding line 31 is arranged vertically and in a zigzag direction along the width of the separator 30A. The protruding lines 31 are provided at regular intervals.

On the surface which faces the membrane electrode assembly 20, these protruding lines 31 form a plurality of reaction gas passages 51, each of which is arranged vertically and in a zigzag direction along the width of the separator 30A. The upper ends and the lower ends of the reaction gas passages 51 respectively communicate with the fuel gas supply hole 11 and the anode off-gas discharge hole 12 via buffer parts 37. Each buffer part 37 has a plurality of protrusions 40 which protrude from the surface facing the membrane electrode assembly 20 of the separator 30A. The upper and lower buffer parts 37 shape the flow of the gas which is drawn from the fuel gas supply hole 11 into the reaction gas passages 51, and then drawn out from the anode off-gas discharge hole 12.

On the surface of the separator 30A, which closely contacts the membrane electrode assembly 20, a sealing part 43 made of an insulating material (e.g., silicone resin) is provided. The sealing part 43 is arranged so as to surround the protruding lines 31 and the buffer parts 37 and also to individually surround almost all the above-described holes. The sealing part 43 forms a gas distribution space together with the membrane electrode assembly 20, and allows each hole to communicate with the corresponding hole of the membrane electrode assembly 20 while securing a close contact state around the holes. Here, the fuel gas supply hole 11 and the anode off-gas discharge hole 12 facing toward the anode must communicate with the buffer parts 37 and the reaction gas passages 51 so as to distribute the fuel gas; thus, no sealing part 43 is provided at a position between the fuel gas supply hole 11 and the corresponding buffer part 37, and also between the anode off-gas discharge hole 12 and the corresponding buffer part 37.

In the separator 30B facing toward the cathode, the surface which closely contacts the membrane electrode assembly 20 also has another sealing part 43. In this case, the oxidant gas supply hole 13 and the cathode off-gas discharge hole 14 must communicate with the buffer parts 37 and the reaction gas passages 51 so as to distribute the oxidant gas; thus, no sealing part 43 is provided at a position between the oxidant gas supply hole 13 and the corresponding buffer part 37, nor between the cathode off-gas discharge hole 14 and the corresponding buffer part 37. Therefore, in this case, the fuel gas supply hole 11 and the anode off-gas discharge hole 12 are individually surrounded by the sealing part 43.

Similarly to the surface which faces the membrane electrode assembly 20, on each back face of the separators 30A and 30B, a sealing part 44 made of an insulating material (e.g., silicone resin) is provided. In each separator, the sealing part 44 is arranged so as to surround the back side of the protruding lines 31 and the buffer parts 37, and also to individually surround almost all the above-described holes of the separator. However, no sealing part 44 is provided between the protruding lines 31 and the supply holes 15 of the cooling water, nor between the protruding lines 31 and the drainage holes 16 of the cooling water.

As shown in FIG. 5, the separator 30A facing toward the anode of one of two adjacent unit cells 10 closely contacts with the separator 30B facing toward the cathode of the other unit cell 10, that is, they contact each other back to back. Between these separators 30A and 30B which closely contact each other, peaks 35 of each protruding line 31 of one of the separators intermittently contact peaks 35 of the corresponding protruding line 31 of the other separator along the length of the protruding lines 31, so that a space is produced between the peaks 35. Accordingly, between the separators 30A and 30B which closely contact with each other back to back, a space is produced through which water or the like can be distributed along the width of the separators. Actually, this space functions as a cooling water passage 53, through which the cooling water drawn from the cooling water supply holes 15 flows toward the cooling water drainage holes 16. The cooling water passage 53, the cooling water supply holes 15, and the cooling water drainage holes 16 are surrounded and sealed by the above-described sealing part 44.

In each unit cell 10 of the fuel cell stack S having the above-described structure, hydrogen ions generated at the anode 22 by catalytic reaction move through the solid polymer electrolyte membrane 21 to the cathode 23, and an electrochemical reaction occurs between the hydrogen ions and oxygen at the cathode 23, thereby generating electric power. In this process, water is also generated. The cooling water flowing through the cooling water passage 53 is used for removing heat of the unit cell 10 (i.e., for cooling the unit cell 10) so that the temperature of the unit cell 10 does not exceed a specific working temperature by the heat generated in accordance with the electric power generation.

As shown in FIGS. 6 to 10, the communication parts 95 for respectively joining the ends of the gas discharge holes 2 and 4 at the other end plate 90B to the drainage passages 8A and 8B each have: (i) a recessed groove 60 formed at a side of the insulating member 98 toward the unit cells 10, and (ii) a cover plate 61 (i.e., a reaction force receiving member) for covering a part of the recessed groove 60 in the middle of the recessed groove 60 along the length thereof. Both ends of the recessed groove 60 along the length thereof respectively communicate with the gas discharge passage 2 (or 4) and the drainage passage 8A (or 8B). The sealing part 44 of the separator 30B of the adjacent unit cell 10 closely contacts the top face of the cover plate 61 in a manner such that it crosses over the recessed groove 60 (see FIG. 8).

More specifically, the cover plate 61 is fit into a step part 62 which is formed between edges of the recessed groove 60. In this state, the top face of the cover plate 61 and the top face of the insulating member 98 form the same plane. A boundary sealing part 44a of the sealing part 44 of the adjacent separator 30B closely contacts the top face of the cover plate 61 so as to secure an airtight state at the position between the gas discharge passage 2 (or 4) and the drainage passage 8A (or 8B).

Figure 9:
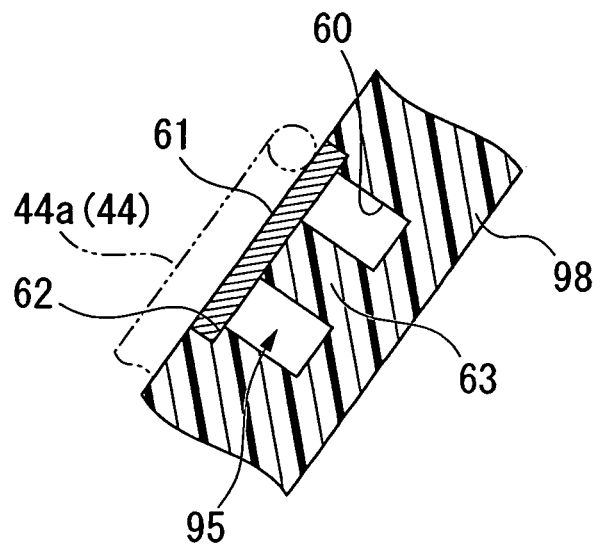
FIG. 9 is a sectional view along line D-D in FIG. 8.

At the center of the recessed groove 60 along the width thereof, a support protrusion 63 is formed, whose top has the same height as that of the step part 62 (see FIG. 9). This support protrusion 63 supports the back face of the cover plate 61. In the present embodiment, the support protrusion 63 and the cover plate 61 form a reaction force receiving member.

In the fuel cell stack S having the above-described structure, when the fuel gas and the oxidant gas are respectively supplied from the gas supply passages 1 and 2, electric power is generated in each unit cell 10, and the reaction water generated during the power generation and the condensed water generated when moisture in the gases is condensed (they are collectively called "residual water" below) are drained through the gas discharge passages 2 and 4, together with the off gases.

When the fuel cell stack S is positioned horizontally (i.e., not inclined), the residual water drawn into the gas discharge passages 2 and 4 flows toward both end plates 90A and 90B through the gas discharge passages 2 and 4. The residual water drained from one end plate 90A is then drained to the outside via the exhaust pipes 91 and the drainage box 94. The residual water entering the other end plate 90B is drawn via the communication parts 95 (provided in the insulating member 98) into the drainage passages 8A and 8B, and is then drained to the outside via the drainage pipes 92 and the drainage box 94.

The fuel cell stack S of the present embodiment is installed in a vehicle; thus, it may be inclined as a result of the inclination of the vehicle.

Below, an inclination in which one end plate 90A is positioned lower is called a "front inclination", and an inclination in which the other end plate 90B is positioned lower is called a "back inclination". Drainage of the residual water for each inclination will be explained below.

Front Inclination

Figure 7:
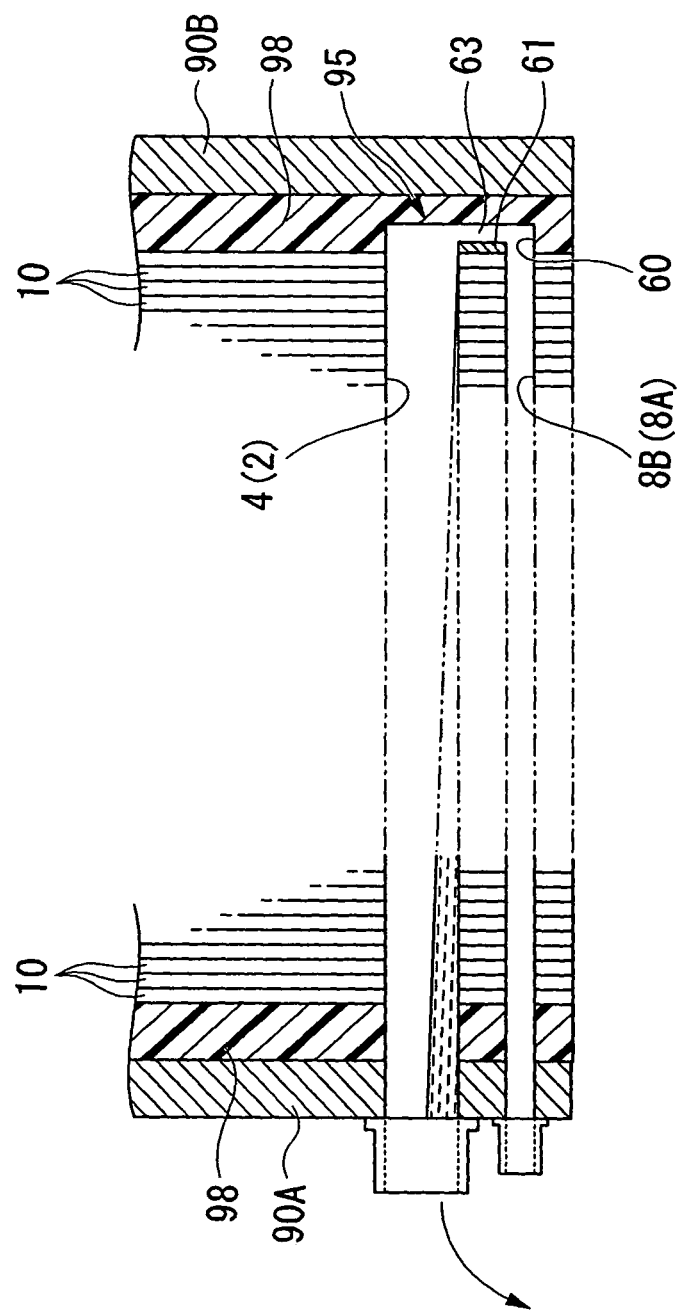
FIG. 7 is a sectional view along line B-B in FIG. 6.
Figure 8:
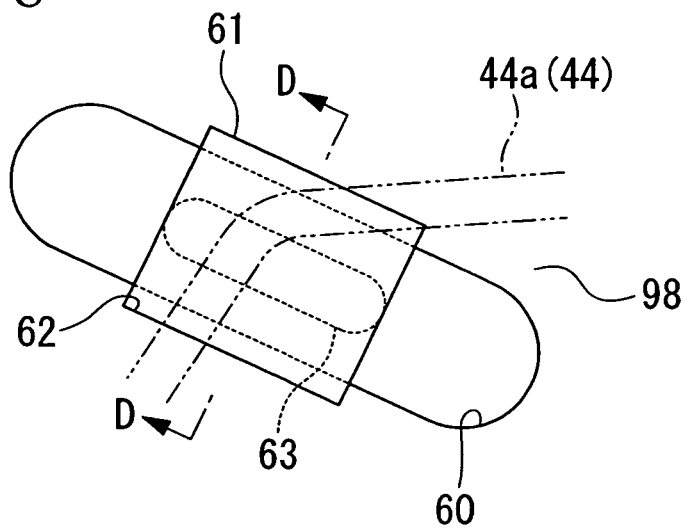
FIG. 8 is an enlarged view of the portion indicated by reference symbol C in FIG. 6.

With respect to the front inclination, as shown in FIG. 7, the gas discharge passages 2 and 4 having a large pipe diameter are inclined in a manner such that one end plate 90A is positioned lower; thus, the residual water is directly drained from the gas discharge passages 2 and 4 to the exhaust pipes 91, and then drained to the outside through the drainage box 94.

Back Inclination

Figure 10:
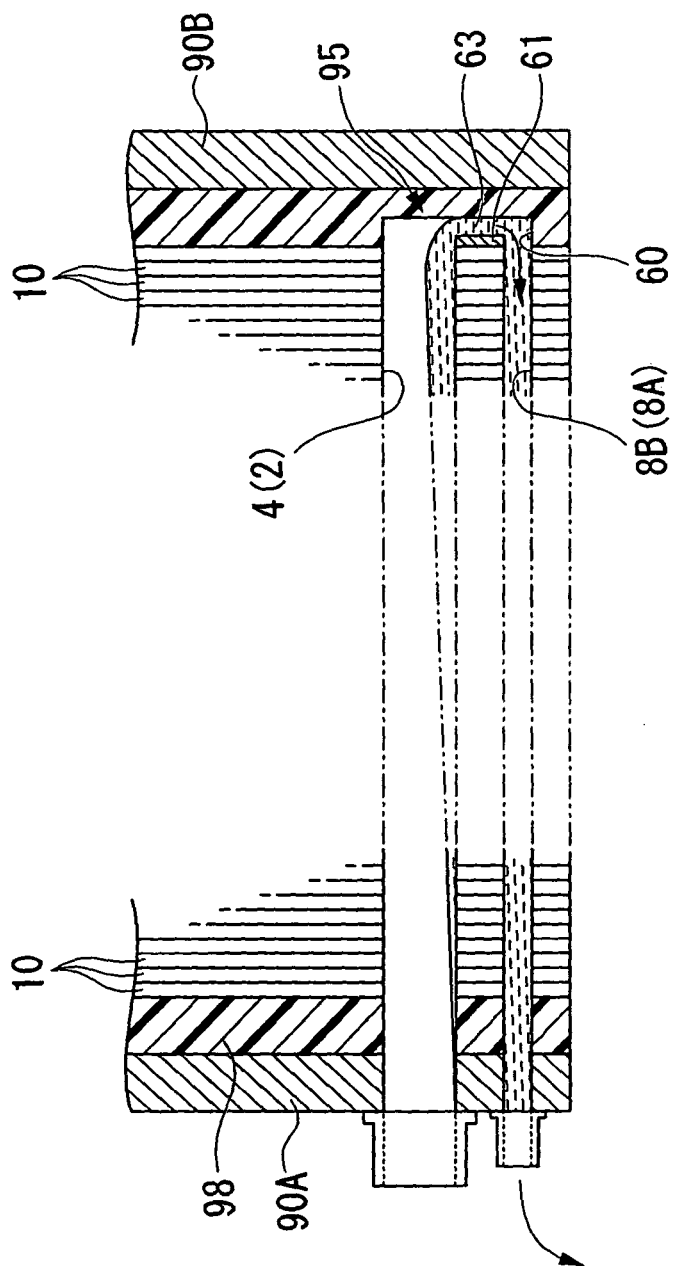
FIG. 10 is a sectional view along line B-B in FIG. 6.

With respect to the back inclination, as shown in FIG. 10, the gas discharge passages 2 and 4 are inclined in a manner such that the other end plate 90B is positioned lower; thus, the residual water is collected at the other end plate 90B, and drawn into the drainage passages 8A and 8B via the communication parts 95 formed in the insulating member 98. In this process, the ends of the drainage passages 8A and 8B at the end plate 90B are positioned lowest among all positions through which the residual water may pass. During the electric power generation, when the inside of the gas discharge passages 2 and 4 has a relatively high pressure in comparison with the atmospheric pressure due to the function of each gas pressure control valve 93 or the like, the residual water drawn into the drainage passages 8A and 8B receives: (i) the gas pressure (higher pressure) applied from the gas drainage passages 8A and 8B, and (ii) the atmospheric pressure (lower pressure) applied from the opposite direction in the drainage passages 8A and 8B. The differential pressure between the above two applied pressures pushes the residual water, which has been drawn into the drainage passages 8A and 8B, toward the drainage box 94.

In particular, in the fuel cell stack S of the present embodiment, the sectional areas of the gas drainage passages 8A and 8B are sufficiently smaller than those of the gas discharge passages 2 and 4. Therefore, when the residual water is drawn into the drainage passages 8A and 8B via the communication parts 95, the residual water occupies or sufficiently narrows each section of the drainage passages 8A and 8B. Accordingly, the gas pressure from the gas discharge passages 2 and 4 is more efficiently applied to the residual water drawn into the drainage passages 8A and 8B, thereby allowing more reliable drainage of the residual water.

Accordingly, even when the fuel cell stack S inclines toward either of the front and back sides, it is possible to reliably drain the residual water to the outside.

In addition, in the fuel cell stack S, the ends of the gas discharge passages 2 and 4 at the end plate 90B are respectively joined to the drainage passages 8A and 8B via the communication parts 95. Therefore, the size of external piping for drainage can be reduced. Therefore, the manufacturing cost can be reduced, and a smaller space is necessary to install the fuel cell stack S. In particular, in the present embodiment, the communication parts 95 are provided in the insulating member 98; thus, no external piping for forming the communication parts 95 is necessary.

Additionally, in the fuel cell stack S, the drainage passages 8A and 8B for draining the residual water are directly formed through the unit cells 10; thus, heat generated by the electric power generation can be directly applied to the drainage passages 8A and 8B. Therefore, even if the residual water remains in the drainage passages 8A and 8B and freezes, the frozen residual water can be quickly melted using the heat generated by the electric power generation.

Furthermore, in this fuel cell stack S, the communication parts 95 for respectively joining the gas discharge passages 2 and 4 to the drainage passages 8A and 8B each consist of: (i) the recessed groove 60 formed in the insulating member 98, (ii) the support protrusion 63 formed inside the recessed groove 60, and (iii) the cover plate 61 supported by the support protrusion 63. Therefore, the communication parts 95 can be easily formed at relatively low cost, and the sealing part 44 of the unit cell 10 adjacent to the insulating member 98 can function normally without problems occurring. More specifically, in the sealing part 44, the boundary sealing parts 44a, positioned between the gas discharge passage 2 and the drainage passage 8A, and between the gas discharge passage 4 and the drainage passage 8B, each cross over the recessed groove 60 while tightly contacting the cover plate 61. Therefore, the boundaries between the gas discharge passage 2 and the drainage passage 8A, and between the gas discharge passage 4 and the drainage passage 8B can be reliably sealed.

In particular, in this fuel cell stack S, the center of the back of the cover plate 61 is supported via the support protrusion 63. Therefore, even when the unit cells 10, interposed and fastened by the end plates 90A and 90B, are strongly pressed onto the insulating member 98, the unit cell 10 adjacent to the insulating member 98 does not deform toward the recessed groove 60.

Other Embodiments

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, in the above-described embodiment, the cooling water passage is provided between every adjacent unit cell 10. However, the cooling water passage may be intermittently formed. In this case, no cooling water passage is provided between some adjacent unit cells 10, and a single separator is commonly used between these unit cells 10. This single separator functions as the separator toward the anode at one of the unit cells 10, and as the separator toward the cathode at the other unit cell 10.

What is claimed is:

1. A fuel cell stack comprising a plurality of stacked unit fuel cells and end holding members for interposing and holding the stacked unit fuel cells from both sides thereof along a direction in which the unit fuel cells are stacked, wherein:

each unit fuel cell has:
- a membrane electrode assembly in which an anode and a cathode interpose an electrolyte membrane; and
- a pair of separators which respectively closely contact the anode and the cathode of the membrane electrode assembly, so as to respectively form reaction gas passages between one of the separators and the anode, and between the other separator and the cathode, and with respect to each of the reaction gas passage facing toward the anode and the reaction gas passage facing toward the cathode:
- a gas supply passage and a gas discharge passage are formed penetrating through the stacked unit fuel cells and one of the end holding members in a manner such that they communicate with the reaction gas passage of each unit fuel cell; and
- a drainage passage is also formed penetrating through the stacked unit fuel cells and said one of the end holding members, wherein an end of the drainage passage and an end of the gas discharge passage on the side of the other end holding member are joined to each other, wherein the drainage passage, while within the fuel cell stack, is formed outside of the gas discharge passage, the drainage passage being separated from the gas discharge passage by a sealing member provided on at least one of the separators.

2. The fuel cell stack in accordance with claim 1, wherein the drainage passage has a sectional area smaller than that of the gas discharge passage.

3. The fuel cell stack in accordance with claim 1, wherein a communication part for joining the gas discharge passage and the drainage passage to each other is provided at the other end holding member.

4. The fuel cell stack in accordance with claim 3, wherein:
- on each side of each unit fuel cell, the sealing member is provided between an edge of the gas discharge passage and an edge of the drainage passage, so as to prevent leakage of water through a gap between each edge and a member facing thereof; and
- at the other end holding member, the communication part has:
  - a recessed groove for joining the gas discharge passage and the drainage passage to each other; and
  - a reaction force receiving member, arranged in the recessed groove, for receiving a reaction force applied from the sealing member which belongs to the unit fuel cell adjacent to the other end holding member and contacts the reaction force receiving member.

5. The fuel cell stack in accordance with claim 3, wherein:
- the other end holding member has an end plate and an insulating member which is positioned between the end plate and the unit fuel cell adjacent to the other end holding member; and
- the communication part is formed in an insulating member.

6. The fuel cell stack in accordance with claim 1, wherein the lowest position of the drainage passage is lower than the lowest position of the gas discharge passage with respect to the gravitational direction.

* * * * *